(12) United States Patent
Smith

(10) Patent No.: US 6,292,117 B1
(45) Date of Patent: Sep. 18, 2001

(54) INTEGRATED ADJUSTABLE CURRENT TO VOLTAGE CONVERTER AND DIGITAL QUADRATURE GENERATOR IN A PRINTER PAPER POSITIONING SYSTEM

(75) Inventor: Glenn M. Smith, Vancouver, WA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/388,127

(22) Filed: Sep. 1, 1999

(51) Int. Cl.[7] .................................................. H03M 1/48
(52) U.S. Cl. .............................................. 341/115; 358/1.5
(58) Field of Search ................................... 341/155, 115, 341/118; 358/1.5, 1.1

(56) References Cited

U.S. PATENT DOCUMENTS

| | | | |
|---|---|---|---|
| 4,282,515 | * | 8/1981 | Patterson, III ........................ 340/347 |
| 4,949,306 | * | 8/1990 | Nakagome et al. ............. 365/189.01 |
| 5,729,493 | * | 3/1998 | Morton ............................. 365/185.21 |

* cited by examiner

*Primary Examiner*—Peguy JeanPierre

(57) ABSTRACT

In a printer, a paper positioning system is used to control feeding a printing medium, such as paper, through the printer. An optical encoder is used to generate analog current waveforms as the paper is fed through the printer. An integrated adjustable current to voltage converter and digital quadrature generator are used to convert waveforms received from the optical encoder into a digital form and then selectively converted to digital form for use by the paper positioning system.

20 Claims, 4 Drawing Sheets

INTEGRATED ADJUSTABLE CURRENT TO VOLTAGE CONVERTER AND DIGITAL QUADRATURE GENERATOR IN A PRINTER PAPER POSITIONING SYSTEM

TECHNICAL FIELD

This invention relates to printer paper positioning systems. More particularly, the invention relates to an integrated adjustable current to voltage converter and digital quadrature generator in a printer paper positioning system.

BACKGROUND

Computer technology is continually advancing, expanding the need for computers in the personal, business, and academic fields. As the need for computers has grown, so too has the need for various peripheral devices for use with computers, such as printing devices. A wide variety of printing devices exist that operate in a wide range of manners, however all share the same fundamental purpose of generating a "hard copy" of data, whether it be on paper, on transparencies, etc.

Most printers rely on accurate control and positioning of the printing medium (e.g., paper). The paper should be accurately fed through and positioned in the printer in order for the data to be printed accurately. If the paper is not aligned properly in the printer, then various user-perceivable errors in printing can occur, such as inconsistent spacing between lines, parts of characters or other images not being lined up properly, etc.

One way to ensure such accurate control is to include a disc that rotates as the paper is fed through the printer, such as by affixing the disc to a shaft that also controls rollers to feed the paper through the printer. The disc includes markings that are read by an optical encoder, which in turn generates analog current signals as the disc rotates. These signals are then provided to a controller in the printer to use in determining the location of the paper.

One problem that can be encountered in such systems is that the optical encoder generates an analog signal whereas the controller requires input in digital form. Thus, the analog signal from the encoder needs to be converted to digital signals that can be interpreted by the controller.

Furthermore, problems can arise from variances in the optical encoder and the disc, which can be caused by a variety of circumstances. Mechanical variances from the manufacturing process of the optical encoder and/or the disc can result in the optical encoder generating different than expected values. Other variances can also manifest themselves over time, such as a light emitting diode (LED) used by the optical encoder gradually dimming over time, dirt and/or ink accumulating on the disc over time, the temperature of the encoder changing due to frequent use, etc. As these variances can alter the signals generated by the optical encoder, it would be beneficial to provide a mechanism that is tolerant of these variances, allowing accurate paper positioning and paper control despite these variances.

The invention described below addresses these and other disadvantages of the prior art, providing an improved integrated adjustable current to voltage converter and digital quadrature generator.

SUMMARY

In a printer, a paper positioning system is used to control feeding a printing medium, such as paper, through the printer. An optical encoder is used to generate analog current waveforms as the paper is fed through the printer. An integrated adjustable current to voltage converter and digital quadrature generator are used to convert waveforms received from the optical encoder into a digital form and then selectively converted to digital form for use by the paper positioning system.

According to one aspect of the invention, the current to voltage converter includes a current to voltage conversion stage and a gain stage. The current to voltage conversion stage includes an adjustable current source, and the gain stage includes switched resistors. This adjustability in the current to voltage converter allows the converter to be adjusted to account for variances encountered by the optical encoder.

According to another aspect of the invention, two comparisons are made (based on two waveforms received from the optical encoder) to generate digital quadrature encoding signals. These two comparisons are: 1) comparing the two waveforms and generating an output based on which has a greater value; and 2) comparing one waveform with the inverse of the other waveform and generating an output based on which of these has a greater value.

According to another aspect of the invention, a multiplexer is used to select one of various analog signals, based on the waveforms received from the optical encoder, to be converted to digital form. The multiplexer includes an "auto select" setting that causes one of the various analog signals to be selected for conversion based on digital quadrature encoding signals input to the multiplexer.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In the discussions to follow, reference is made to digital signals being at a "high value" or at a "low value". A high value typically refers to a digital signal having a voltage between 1.5 and 5.5 volts. A low value typically refers to a digital signal having a voltage between 0.0 and 0.5 volts.

Figure 1:
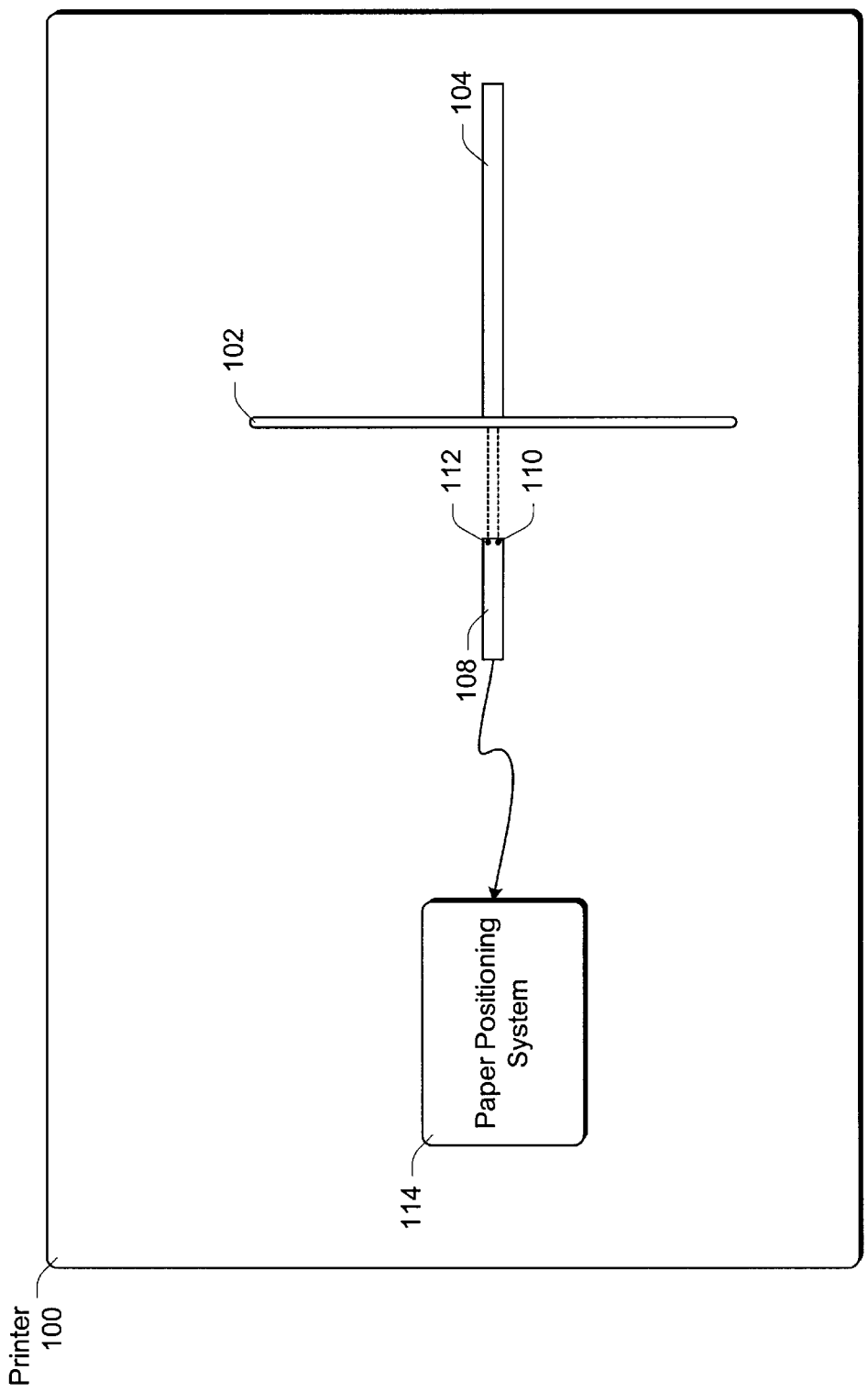
FIG. 1 is a diagram illustrating an exemplary printer as may be used in accordance with the invention.

FIG. 1 is a diagram illustrating an exemplary printer as may be used in accordance with the invention. A printer 100 includes a disc 102 mounted to a shaft 104 that rotates as shaft 104 rotates. Shaft 104 is also used to control rollers (not shown) for feeding a printing medium through printer 100. The invention is discussed herein with reference to paper as a printing medium. However, it is to be appreciated that any of a wide variety of printing media can be used with printer 100, including paper, transparencies, cloth, etc.

Additional well-known components (not shown) are also included in printer 100, such as input/output (I/O) control circuitry, a microprocessor, a power regulator, printing mechanisms (e.g., ink pens or other components for distributing ink or toner onto the printing medium), etc. Such additional components have not been illustrated to avoid cluttering the drawings.

Figure 2:
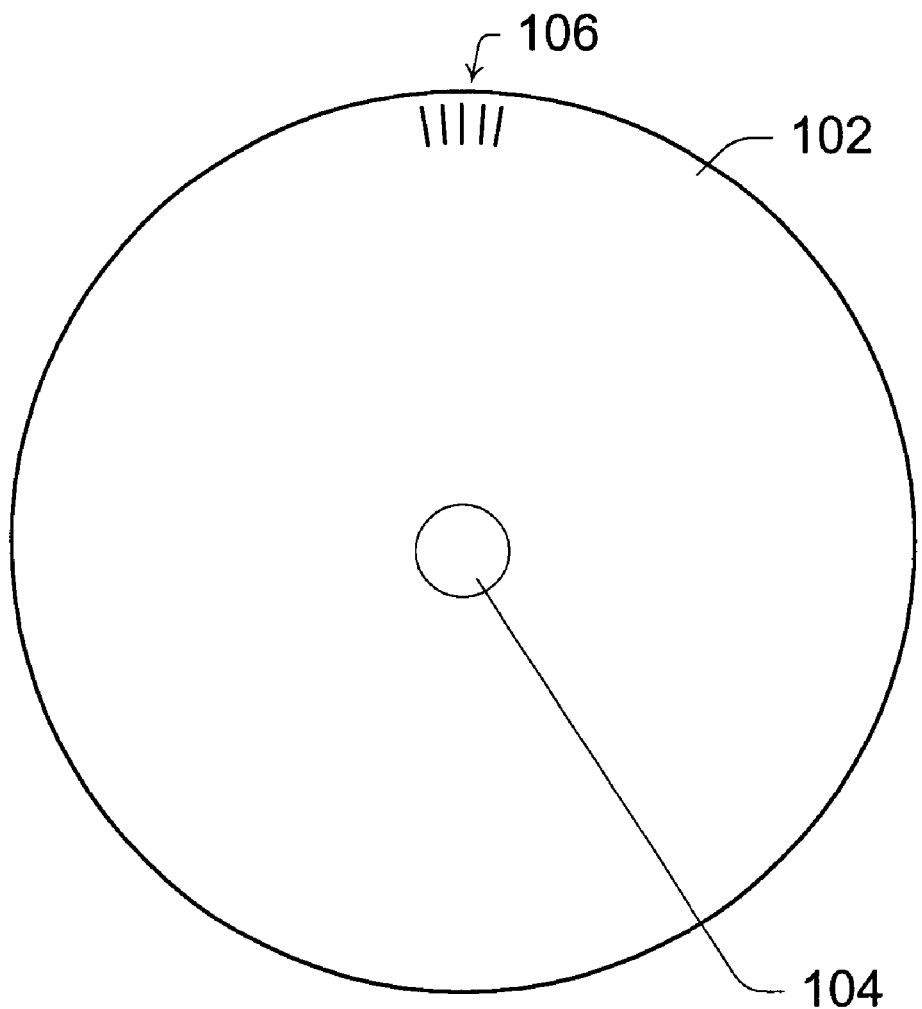
FIG. 2 illustrates an exemplary disc of FIG. 1 in more detail.

FIG. 2 illustrates an exemplary disc 102 in more detail. The following discussions of disc 102 refer to FIGS. 1 and 2. Disc 102 includes markings 106 along the outer edge or rim of one surface of the disc. Although only a few markings 106 are illustrated, the markings are distributed along the entire circumference of disc 102. In one implementation, markings 106 are distributed with a distance of 0.005 inches between center points of the marks. Alternatively, different spacings could be used.

An optical encoder 108 includes two LED/receiver sets 110 and 112. In one implementation, the spacing between LED/receiver sets 110 and 112 is one-quarter that of the center point to center point distance of the markings 106 (e.g., 0.00125 inches if markings 106 are distributed with a center point to center point distance of 0.005 inches). For each set 110 and 112, the LED illuminates the side surface of disc 102, including markings 106. As disc 102 rotates, the light detected by the receiver of each set 110 or 112 varies based on which portion of the edge of disc 102 is illuminated (and how much, if any, of one of markings 106 is illuminated). Each receiver generates an analog current waveform as disc 102 rotates, also referred to herein as waveforms (or channels) A and B.

At times when disc 102 rotates at an approximately constant rate, optical encoder 108 generates two current waveforms having an approximately rounded triangle form.

Optical encoder 108 provides the waveforms for each of the two channels to paper positioning system 114. Paper positioning system 114 includes circuitry to convert the analog waveforms into values that are useable by other components in system 114 to accurately determine the position of the paper. Each waveform generated by optical encoder 108 typically has a peak to peak value ranging from 15 microamps to 70 microamps. Additionally, the signals output from encoder 108 are bipolar signals that are ideally centered around 0 microamps, but more realistically are offset in a range of −6 microamps to +6 microamps.

The analog current waveforms received from optical encoder 108 are received by current to voltage (I to V) converter circuitry of paper positioning system 114, from which analog voltage waveforms are output to adjustable gain circuitry, as discussed in more detail below with reference to FIG. 3. The analog voltage waveforms are subsequently input to a multiplexer and then selected for input to an analog to digital (A/D) converter of paper positioning system 114, as discussed in more detail below with reference to FIG. 4.

The analog voltage waveforms are also used by comparison circuitry, discussed in more detail below with reference to FIG. 4, to generate quadrature encoding signals. The quadrature encoding signals are then used to determine which of the waveforms input to the multiplexer should be converted to digital form and subsequently used in the determination of the paper position. The use of quadrature encoding is well-known to those skilled in the art and thus will not be discussed further except as it pertains to the invention.

Figure 3:
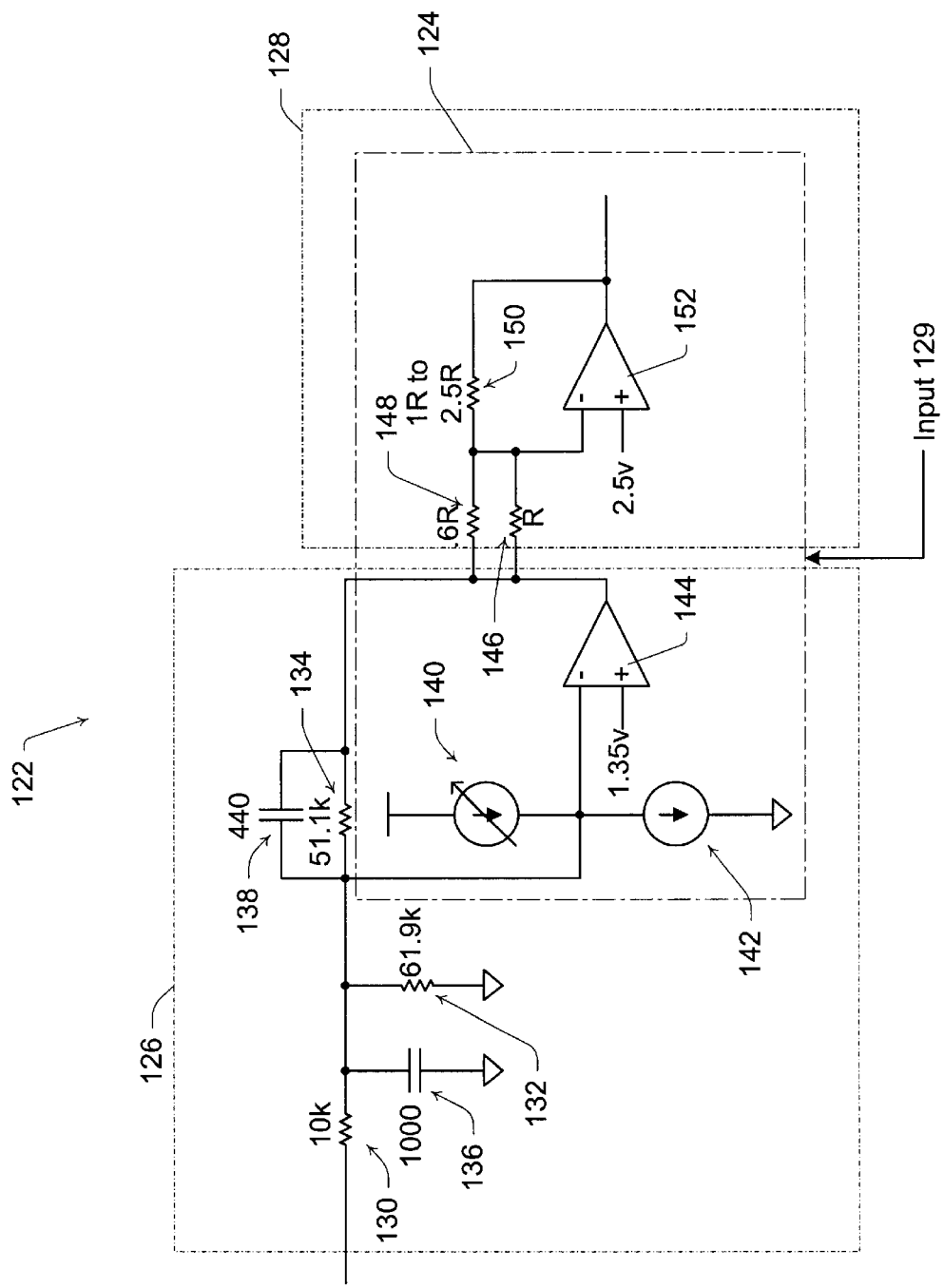
FIG. 3 illustrates exemplary circuitry for a current to voltage converter in accordance with one implementation of the invention.

FIG. 3 illustrates exemplary circuitry for a current to voltage converter in accordance with one implementation of the invention. Circuitry 122 is included in paper positioning system 114 of FIG. 1. In the illustrated example, paper positioning system 114 of FIG. 1 uses a voltage driven A/D converter that requires an analog input voltage of from zero to 5 volts. The circuitry 122 of FIG. 3 converts an analog current signal received from optical encoder 108 to a voltage signal for use by the A/D converter. The circuitry 122 is used for one of the two channels, duplicate circuitry (not shown) is used for the other of the two channels.

In the illustrated example, a portion 124 of circuitry 122 is located on a single integrated circuit (IC), while the remaining components are external to the IC. Alternatively, all of the components could be located on the IC, or separated over multiple IC's.

Circuitry 122 includes two stages 126 and 128. Stage 126 provides the current to voltage conversion, while stage 128 provides an adjustable gain for the voltage signal. Conversion stage 126 generates the analog voltage signal that is centered around a desired voltage level (e.g., 2.5 volts). Gain stage 128 receives the analog voltage signal and allows it to be amplified to a level that the A/D converter can read.

A serial channel input 129 to the IC allows the gain and offset to be adjusted. In the illustrated example, a 5-bit gain adjustment and a 5-bit offset adjustment are provided to the IC for the circuitry 122. Other circuitry analogous to circuitry 122 for the second channel will have separate 5-bit gain and offset adjustments as well, allowing separate adjustment of the two channels Conversion stage 126 includes resistors 130, 132, and 134, capacitors 136 and 138, current sources 140 and 142, and operational amplifier (op amp) 144 coupled together as shown. In the illustrated example, resistors 130, 132, and 134 and capacitors 136 and 138 have the values shown in FIG. 3, with resistances shown in ohms and capacitance shown in picofarads. Current source 140 is a variable current source ranging from zero to 15.5 microamps, and current source 142 is a fixed current source of 8.0 microamps. Alternatively, current source 140 may be a fixed current source and current source 142 a variable current source.

Conversion stage 126 receives as an input the analog current signal from optical encoder 108 of FIG. 1. As mentioned above, the input analog current signal is a bipolar signal that typically has a peak to peak value ranging from 15 microamps to 70 microamps and an offset ranging from −6 microamps to +6 microamps. Conversion stage 126 converts the analog current signal to an analog voltage signal having a waveform that is centered around 2.5 volts and has a peak to peak maximum of 5 volts. However, the voltage level at which the analog voltage signal is centered can be altered by adjusting variable current source 140.

The 5-bit offset adjustment setting allows for settings of zero through 31. In the illustrated example, current source 140 is a variable current source and the 5-bit setting is used to vary the current source from zero to 15.5 in 0.5 microamp increments. Thus, in combination with fixed current source 142, the 5-bit settings allow for a current offset ranging typically from approximately −8.0 microamps to +8.0 microamps.

The analog voltage signal generated by stage 126 is input to gain stage 128. Gain stage 128 includes resistors 146, 148, and 150, and op amp 152, coupled together as shown. In the illustrated example, resistor 146 has a value of R, resistor 148 has a value of 0.6×R, and resistor 150 represents a group of switched resistors (typically in series) providing a resistance ranging from 1×R to 2.5×R. Gain stage 128 provides an amplification of the voltage signal to a level that the A/D converter will be able to sense.

In one implementation the value of R is 50 k ohms, although the value of R can vary in different implementations.

The 5-bit gain adjustment setting allows for settings of zero through 31. In the illustrated example, resistor 148 is a switched resistor and the most significant bit of the 5-bit value is used to determine whether the resistor is switched on or off (e.g., a most significant bit value of 0 switches resistor 148 off, and a most significant bit value of 1 switches resistor 148 on). The four least significant bits of the 5-bit setting are used to set resistor group 150 to a value of 1×R to 2.5×R with 0.1×R increments. The 5-bit gain adjustment results in a gain of (1+0.1×S), where S is the setting, for setting values of 0 through 15, and a gain of ((1+0.1×(S−16))÷0.375) for setting values of 16 through 31.

Switched resistors are well-known to those skilled in the art and thus will not be discussed further except as they pertain to the invention.

Circuitry 122 provides gain adjustment as well as offset adjustment as discussed above. These adjustments allow the generated analog voltage signal to be adjusted over a range of approximately 246 "counts" (each count being 20 millivolts), allowing variances in optical encoder 108 or disc 102 of FIG. 1 to be compensated for. In other words, circuitry 122 allows the analog voltage signal to be adjusted in 20 millivolt increments. Although a granularity finer than 20 millivolts may be supportable by circuitry 122, the A/D converter may not be able to support such a fine granularity.

Figure 4:
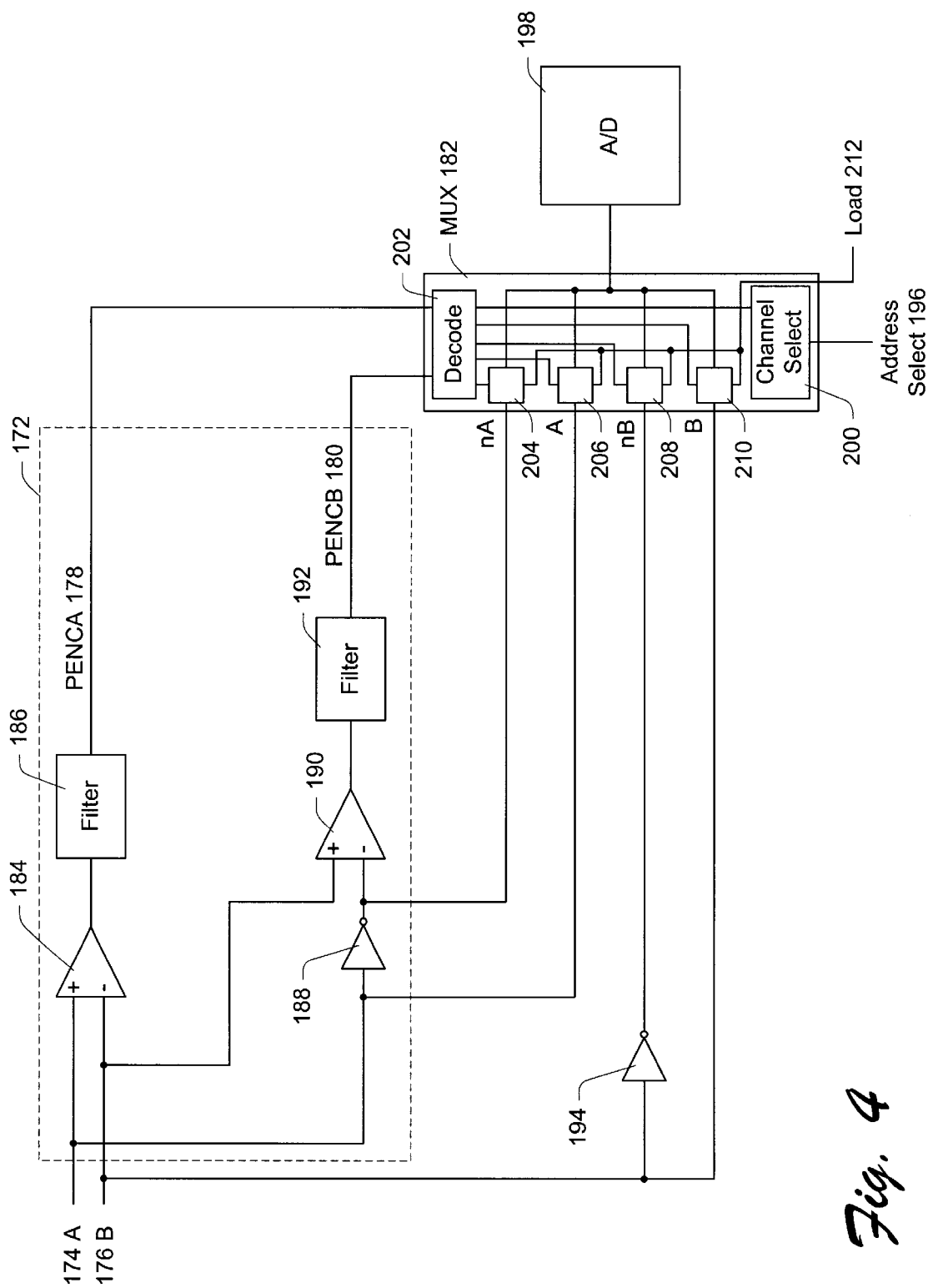
FIG. 4 illustrates exemplary components for generating digital quadrature signals and selecting analog signals for conversion in accordance with one implementation of the invention.

FIG. 4 illustrates exemplary components for generating digital quadrature signals and selecting analog signals for conversion in accordance with one implementation of the invention. In the illustrated example, the components of FIG. 4 are integrated into the same IC as the portion 124 of circuitry 122 of FIG. 3. Digital quadrature generator 172 receives two analog voltage signals, signal "A" 174 and signal "B" 176. The signals 174 and 176 are analog voltage signals that have been converted to voltage signals by circuitry 122 of FIG. 3 (which was received by circuitry 122 as current signals from optical encoder 108 of FIG. 1).

Generator 172 uses signals 174 and 176 to generate digital quadrature encoding signals PENCA 178 and PENCB 180. The digital quadrature encoding signals 178 and 180 are subsequently used by multiplexer (mux) 182 to identify which of the signals 174 and 176 (or their inverses) are to be used to determine the paper position.

Signals 174 and 176 are input to comparator 184 which outputs a digital high value when the value of analog signal 174 is greater than or equal to the value of analog signal 176, and outputs a digital low value when the value of analog signal 174 is less than the value of analog signal 176. The output of comparator 184 is input to a filter 186, the output of which is PENCA signal 178. Filter 186 temporally filters the output of comparator 184, changing signal 178 only when the input from comparator 184 has changed and remained the same for a length of time (e.g., three rising clock edges).

Signal 174 is also input to an inverter 188 to generate the inverse of signal 174, referred to as the "not A" or "nA" signal. The nA signal from inverter 188 is input to a comparator 190 along with signal 176. Comparator 190 outputs a digital high value when the value of analog signal 176 is greater than or equal to the value of analog signal nA from inverter 188, and outputs a digital low value when the value of analog signal 176 is less than the value of nA signal from inverter 188. The output of comparator 190 is input to a filter 192, the output of which is PENCB signal 180. Filter 192 temporally filters the output of comparator 190, analogous to filter 186 discussed above.

Signal 176 is also input to an inverter 194 to generate the inverse of signal 176, also referred to as the "not B" or "nB" signal.

The signals 174 and 176, as well as their inverses, are input to ports of multiplexer 182, illustrated as input signals nA, A, nB, and B. The PENCA 178 and PENCB 180 signals are also input to multiplexer 182, as well as address select signals 196. Based on the PENCA 178 and PENCB 180 signals, one of input signals nA, A, nB, and B is input to A/D 198 for conversion.

Multiplexer 182 can operate in a "normal" mode or an "auto select" mode. When operating in "normal" mode, channel select logic 200 in multiplexer 182 uses address select signals 196 to identify a particular one of input signals nA, A, nB and B (or possibly other inputs not germane to the invention and not shown) which is to be provided to A/D converter 198 for conversion to digital form.

Multiplexer 182 can be changed to "auto select" mode by inputting a predetermined address as address select signals 196. In response to receiving this predetermined address, multiplexer 182 switches to "auto select" mode—channel select logic 200 is no longer enabled to select one of input signals nA, A, nB and B, but decode logic 202 is enabled to select one of input signals nA, A, nB and B to be provided to A/D converter 198 based on the PENCA 178 and PENCB 180 signals. Decode logic 202 enables one of latches 204, 206, 208, or 210 to provide its corresponding signal (nA, A, nB and B, respectively) to A/D converter 198. Table I illustrates encodings for selection from nA, A, nB, and B based on PENCA 178 and PENCB 180 according to one implementation of the invention.

TABLE I

| PENCA | PENCB | Input Selected |
|---|---|---|
| 0 | 0 | Signal nB |
| 0 | 1 | Signal nA |
| 1 | 0 | Signal A |
| 1 | 1 | Signal B |

The selected one of the analog input signals nA, A, nB, and B is provided to A/D converter 198 by multiplexer 182. The digital value of the selected input signal is then provided to additional processing logic (not shown) within the paper positioning system 114 of FIG. 1 and used to determine the paper location. Such determination can be made in any of a wide variety of conventional manners. However, such determination typically requires the maintenance of a transition table by the paper positioning system (e.g., in firmware). In the illustrated example, separate transition tables would be maintained corresponding to each of the four rising slopes (one each for the nA, A, nB, and B signals). Generator 172, by performing the comparisons described above, potentially reduces the number of transition tables that must be maintained to four.

Additionally, sample values (e.g., from a sample capacitor) for the nA, A, nB, and B signals are latched into their respective latches 204–210 based on a common "load" signal 212. By obtaining the analog current signals from optical encoder 108 substantially concurrently, by latching sample values for the nA, A, nB, and B signals substantially concurrently, and by generating all of the signals nA, A, nB, and B on the same IC, synchronization can be maintained more easily. The signals nA, A, nB, and B are generated and readily available to the multiplexer 182, no delay is necessary due to a determination being made based on the PENCA and PENCB signals of which of the nA, A, nB, and B signals needs to be looked at, followed by a sampling and conversion of that signal. Rather, the signals are readily available to multiplexer 182 and can be converted by A/D within a known, fixed amount of time (e.g., 6 microseconds).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An apparatus comprising:
analog circuitry coupled to receive a plurality of analog current signals from an analog encoder and convert the plurality of analog current signals to a plurality of analog voltage signals, the analog circuitry including adjustable offset circuitry and adjustable gain circuitry, wherein the adjustable offset circuitry comprises a variable current source; and
digital quadrature generator circuitry to generate a plurality of quadrature encoding signals based on the plurality of analog voltage signals.

2. An apparatus as recited in claim 1, wherein the apparatus comprises a single integrated circuit.

3. An apparatus as recited in claim 1, wherein the apparatus comprises a paper positioning system of a printer.

4. An apparatus as recited in claim 1, wherein the adjustable offset circuitry provides a range of approximately negative 8 microamps to approximately positive 8 microamps.

5. An apparatus as recited in claim 1, further comprising a multiplexer that receives the plurality of analog voltage signals and the plurality of quadrature encoding signals, and automatically selects one of the plurality of analog voltage signals for conversion by an analog to digital converter based on the plurality of quadrature encoding signals.

6. An apparatus as recited in claim 5, wherein the multiplexer also includes an address input that enables the multiplexer to select one of the plurality of analog voltage signals for conversion based on the plurality of quadrature encoding signals.

7. An apparatus comprising:
analog circuitry coupled to receive a plurality of analog current signals from an analog encoder and convert the plurality of analog current signals to a plurality of analog voltage signals, the analog circuitry including adjustable offset circuitry and adjustable gain circuitry, wherein the adjustable gain circuitry comprises one or more switched resistors; and
digital quadrature generator circuitry to generate a plurality of quadrature encoding signals based on the plurality of analog voltage signals.

8. An apparatus as recited in claim 7, wherein the adjustable gain circuitry provides a gain range of approximately 1.0 to approximately 6.67.

9. An apparatus as recited in claim 7, further comprising a multiplexer that receives the plurality of analog voltage signals and the plurality of quadrature encoding signals, and automatically selects one of the plurality of analog voltage signals for conversion by an analog to digital converter based on the plurality of quadrature encoding signals.

10. An apparatus as recited in claim 9, wherein the multiplexer also includes an address input that enables the multiplexer to select one of the plurality of analog voltage signals for conversion based on the plurality of quadrature encoding signals.

11. A circuit comprising:
a conversion stage including,
a first operational amplifier having a first input coupled to a first fixed voltage source, and
a fixed current source and a variable current source coupled to a second input of the first operational amplifier; and
a gain stage including,
a plurality of resistors coupled in parallel to an output of the first operational amplifier,
a second operational amplifier having a first input coupled to a second fixed voltage source, and
an adjustable feedback resistor coupled to the plurality of resistors, to a second input of the second operational amplifier, and to an output of the second operational amplifier.

12. A circuit as recited in claim 11, further comprising:
another conversion stage including,
a third operational amplifier having a first input coupled to the first fixed voltage source, and
another fixed current source and another variable current source coupled to a second input of the third operational amplifier;
another gain stage including,
another plurality of resistors coupled in parallel to an output of the third operational amplifier,
a fourth operational amplifier having a first input coupled to the second fixed voltage source,
another adjustable feedback resistor coupled to the plurality of resistors, to a second input of the fourth operational amplifier, and to an output of the fourth operational amplifier; and
a digital quadrature generator, coupled to the output of the second operational amplifier and the output of the third operational amplifier, including,
a first comparator having a first input coupled to the output of the second operational amplifier and a second input coupled to the output of the fourth operational amplifier,
an inverter having an input coupled to the output of the second operational amplifier, and
a second comparator having a first input coupled to the output of the fourth operational amplifier and an output of the inverter.

13. An apparatus comprising:
a plurality of analog input ports;
a decoder to receive a plurality of quadrature encoding signals;
a channel select to receive an address selection signal and, in response to the address selection signal having a predetermined value, enabling the decoder; and
wherein the decoder, upon being enabled, is to select one of a plurality of analog inputs received via the plurality of analog input ports based on the plurality of quadrature encoding signals.

14. An apparatus as recited in claim 13, wherein the apparatus is further to provide the selected one of the plurality of analog inputs to an analog to digital converter.

15. An apparatus as recited in claim 13, wherein the apparatus comprises a single integrated circuit.

16. An apparatus as recited in claim 13, further comprising:
analog circuitry coupled to receive a plurality of analog current signals from an analog encoder and convert the plurality of analog current signals to a plurality of analog voltage signals, the analog circuitry including adjustable offset circuitry and adjustable gain circuitry; and
wherein the plurality of analog voltage signals are provided to the plurality of analog input ports.

17. An apparatus as recited in claim 13, wherein the apparatus comprises a printer.

18. An apparatus as recited in claim 13, wherein the channel select is further to select one of the plurality of analog inputs received via the plurality of analog input ports based on the address selection signal if the address selection signal does not have the predetermined value.

19. An apparatus comprising:

analog circuitry coupled to receive a plurality of analog current signals from an analog encoder and convert the plurality of analog current signals to a plurality of analog voltage signals, the analog circuitry including adjustable offset circuitry and adjustable gain circuitry; and digital quadrature generator circuitry to generate a plurality of quadrature encoding signals based on the plurality of analog voltage signals, wherein the digital quadrature generator circuitry generates a first of the plurality of quadrature encoding signals by detecting whether the value of a first of the plurality of analog voltage signals is greater than a second of the plurality of analog voltage signals, and wherein the digital quadrature generator circuitry generates a second of the plurality of quadrature encoding signals by detecting whether the value of the second of the plurality of analog voltage signals is greater than the inverse of the first of the plurality of analog voltage signals.

20. An apparatus comprising:

a plurality of analog input ports;

a decoder to receive a plurality of quadrature encoding signals;

a channel select to receive an address selection signal and, in response to the address selection signal having a predetermined value, enabling the decoder;

wherein the decoder, upon being enabled, is to select one of a plurality of analog inputs received via the plurality of analog input ports based on the plurality of quadrature encoding signals;

analog circuitry coupled to receive a plurality of analog current signals from an analog encoder and convert the plurality of analog current signals to a plurality of analog voltage signals, the analog circuitry including adjustable offset circuitry and adjustable gain circuitry;

wherein the plurality of analog voltage signals are provided to the plurality of analog input ports; and a digital quadrature generator circuitry to generate a plurality of quadrature encoding signals based on the plurality of analog voltage signals, wherein the digital quadrature generator circuitry is to generate a first of the plurality of quadrature encoding signals by detecting whether the value of a first of the plurality of analog voltage signals is greater than a second of the plurality of analog voltage signals, and generate a second of the plurality of quadrature encoding signals by detecting whether the value of the second of the plurality of analog voltage signals is greater than the inverse of the first of the plurality of analog voltage signals.

\* \* \* \* \*